(12) United States Patent
Lu et al.

(10) Patent No.: US 7,590,749 B2
(45) Date of Patent: Sep. 15, 2009

(54) METHOD AND APPARATUS FOR MULTICAST MANAGEMENT OF USER INTERFACE IN A NETWORK ACCESS DEVICE

(75) Inventors: LinLi Lu, Shanghai (CN); HongBin Yu, Shanghai (CN); YingZhong Miao, Shanghai (CN); JianHua Zhu, Shanghai (CN)

(73) Assignee: Alcatel, Paris (FR)

( * ) Notice: Subject to any disclaimer, the term of this patent is extended or adjusted under 35 U.S.C. 154(b) by 498 days.

(21) Appl. No.: 11/452,263

(22) Filed: Jun. 14, 2006

(65) Prior Publication Data

US 2007/0011350 A1   Jan. 11, 2007

(30) Foreign Application Priority Data

Jun. 15, 2005   (CN) .................... 2005 1 0026790

(51) Int. Cl.
   *G06F 13/00* (2006.01)
(52) U.S. Cl. .................... 709/230; 709/238; 370/390
(58) Field of Classification Search ................ 709/230, 709/231, 238, 242, 223; 370/390
   See application file for complete search history.

(56) References Cited

U.S. PATENT DOCUMENTS

| | | | |
|---|---|---|---|
| 6,097,720 A * | 8/2000 | Araujo et al. ............... | 370/355 |
| 6,457,059 B1 * | 9/2002 | Kobayashi .................. | 709/242 |
| 6,826,612 B1 * | 11/2004 | Bosloy et al. ............... | 709/227 |
| 7,228,356 B2 * | 6/2007 | Nguyen et al. .............. | 709/231 |
| 7,487,251 B2 * | 2/2009 | Kobayashi .................. | 709/230 |
| 2003/0041171 A1 * | 2/2003 | Kobayashi .................. | 709/242 |
| 2004/0090970 A1 | 5/2004 | Sanchez | |
| 2004/0111470 A1 * | 6/2004 | Poulsen et al. ............. | 709/204 |
| 2005/0041680 A1 | 2/2005 | Tanaka | |
| 2005/0198130 A1 * | 9/2005 | Bosloy et al. ............... | 709/204 |

FOREIGN PATENT DOCUMENTS

| | | |
|---|---|---|
| EP | 1 359 709 A2 | 11/2003 |
| EP | 1 624 612 A | 2/2006 |

\* cited by examiner

*Primary Examiner*—Kenneth R Coulter
(74) *Attorney, Agent, or Firm*—Harness, Dickey & Pierce, P.L.C.

(57) ABSTRACT

The present invention discloses a method and apparatus for multicast management of user interface in a network access device, which comprises setting a user multicast information table for the user interface in the network access device, IGMP protocol processing unit obtaining the user identification information from a user IGMP message, retrieving and updating the user multicast information table based on types of multicast messages; checking the user multicast information table of the user interface when multicast resources of the user interface are not sufficient, immediately terminating the multicast GSQ process and directly performing quick-leaving when the user multicast information table of a multicast group is empty, in conjunction with use of items of multicast state. The present invention can greatly enhance speed and performance of switching for multicast channels of the network access device.

15 Claims, 3 Drawing Sheets

|  | Multicast address | User identification | Multicast state |
|---|---|---|---|
| Ch.1 | 225.0.1.2 | STB1 | A |
| Ch.2 | 225.0.1.3 | STB3 | B |
|  |  | STB4 |  |
| Ch.3 | 225.0.1.4 |  | C |

METHOD AND APPARATUS FOR MULTICAST MANAGEMENT OF USER INTERFACE IN A NETWORK ACCESS DEVICE

TECHNICAL FIELD

The present invention relates to a method for multicast service management in a communication network access device, particularly to a method for multicast management of multi-user interface for enhancing switching performance of multicast service channel and apparatus for implementing the method.

BACKGROUND OF THE INVENTION

With increasing development in use of communication technology, multicast service (e.g. IP TV network television, IP conference television service, IP online courses and etc.) has increasingly become a widespread and public service, which is becoming noticeable business point of growth.

FIG. 1 is a schematic diagram of a typical IP multicast architecture. A multicast routing protocol is used between a local router and a remote router, and can be Distance Vector Multicast Routing Protocol (DVMRP), Protocol Independent Multicast-Dense Mode (PIM-DM) and etc. This protocol form a routing forwarding table for multicast based on topology for interfaces entering a multicast group. A group membership protocol is used between an IGMP host and the local router. For example, a typical Internet Group Management Protocol (IGMP) host notifies the local router by this protocol that it desires to enter a certain multicast group and receive messages thereof, while the local router periodically queries whether a member of a known group within a local area network is in an active state (i.e. whether there are still some members belonging to a certain multicast group in this network section) to create and maintain membership information in a direct interconnection section of the router. Also, in order to effectively suppress diffusion of multicast data on a link layer, multicast protocols such as IGMP Snooping/Proxy are introduced into a network device of an access layer.

As shown in FIG. 2, a network access device DSLAM (Digital Subscriber Line Access Multiplexer) effects the functions of IGMP Proxy/enhanced IGMP Snooping. IGMP Proxy/enhanced IGMP Snooping receives a multicast membership report message from a user interface, analyzes IP addresses of multicast groups in the message, create a multicast forwarding table for the IP address of a respective multicast group and the user interface, and forwards the message to an upper layer device. Multicast service streams are replicated to a plurality of network interface based on the multicast forwarding table, and each network interface can be connected to several user terminals (e.g. STB, PC terminals) via a Customer Premises Equipment (CPE). Multicast service often has relative higher requirement for response speed of devices due to its high real-time requirement and high service quality requirement for being directly oriented to terminal users. For example, the device is required to be ms level with respect to processing on request for terminal multicast users leaving. There exist two versions of IGMA for use (IGMAv1, IGMPv2). For a user of IGMPv1, the terminal can enter the multicast group without Leave message. For a user of IGMPv2, it is comprised of Leave message and allows quickly reporting termination of members to the network device. For a user of IGMPv1, when channels are switched for the user, the network access device receives request for entering other channel from the user, but it can not determine whether the user has left the previous multicast service channel or there are other users receiving data from the previous multicast service channel at present. Now the approaches which can be used are mainly two types: A) rule of latest-request-first: DSLAM deletes the interface from the multicast group of the multicast service table and in turn the multicast data stream stops. The shortcomings of this approach are apparent in spite of its high leaving speed: first, the system sets a latest-transmitted message for entering the multicast group from the user as high priority so as to affect the multicast service which the user originally makes request to enter; second, when there are a plurality of users of the multicast on the same interface, one user newly entering the channel will have an effect on other users using the channel. B) General Membership Query (GMQ) process including querying whether there are users on the interface, still transmitting the multicast data stream to the user interface if there are other users responding to this querying; otherwise DSLAM deletes the user interface from the multicast group of the multicast service table and in turn the multicast data stream stops. The GMQ process usually requires a period of response time according to specification of the protocol, while it is directed to all multicast groups, and thus it is possible to result in a great amount of interactions of IGMP protocol packets, which increase burden of the network and affect performance of the system. For a user of IGMPv2, when channels are switched for the user, an IGMA message, which usually has one Leave message followed by two or three Join messages, is transmitted to the DSLAM interface connected to the user. After DSLAM receives the Leave message, two processes as follows can be used in accordance with RFC2236: A) quick-leave approach: DSLAM deletes the interface from the multicast group of the multicast service table and in turn the multicast data stream stops; in this approach, despite high leaving speed, when there are a plurality of users of the multicast on the same interface, leaving of one user will have an effect on other users on use. B) process of entering Group Specification Query (GPQ) including querying whether there are still other users of the multicast group on the interface, still transmitting the multicast data stream to the user interface if there are other users responding to this querying; otherwise DSLAM deletes the user interface from the multicast group of the multicast service table and in turn the multicast data stream stops. The GSQ process usually requires a period of 1-2 seconds according to specification of the protocol, so that when channels are switched for the user, the response speed of the system is relatively low, the previous multicast data stream can not stop to release interface resource and the newly-added multicast data stream can not be provided to the user immediately if the interface resource is limited at that time (e.g. due to bandwidth limit), which will have an effect on service experience of the user.

An improved method for channel switching in IGMP service provided in U.S. Pat. No. 7,228,356, entitled "IGMA Expected Leave Triggered BY MAC Address", which determines whether the Leave message is transmitted by means of tracing and comparing MAC information of users. However, this solution has the following defects: 1) the user information is traced and recorded only when the user enters, and when there are a plurality of users, the items are too many, which occupy precious memory space in operation; 2) the tracing and recording table of the user is so long that it takes too long time to search for match, so delay performance will be affected when the user is switched to leave; 3) this solution can not effectively solve the problem of quick-leaving for IGMPv1 since there is no Leaving message when the user of IGMPv1 leaves multicast; 4) when switching-back of channels is performed on users, the previous leaving multicast data stream need to be re-established.

Thus it can be seen that an effective means for multicast service of user interface management is lacked in the existing network access device.

SUMMARY OF THE INVENTION

The present invention proposes a method and apparatus for multicast management of user interface in a network access device, which enhances channel switching performance of multicast service, selects protocol processing flows according to particular circumstances of current user when channel switching is performed on the user, and enhances switching performance of user to the most without affecting the user normally enjoying services.

The following technical solutions are used in the present invention:

A method for multicast connection management of user interface in a network access device, which is connected to several user terminals via the user interface, the method comprising: a) setting a user multicast information table for the user interface in the network access device, having information items at least including multicast addresses and user identification information; b) obtaining the user identification information from a user IGMP message by the network access device, retrieving the user multicast information table and adding a corresponding item containing the multicast address and the user identification information into the user multicast information table if the user is new for the multicast group which he makes request for entering when said user IGMP message is a Join message, deleting the item of the multicast group corresponding to the user identification information from the user multicast information table, entering a GSQ process and waiting for a next IGMP message when said user IGMP message is a Leave message; c) providing a multicast data stream of request for entering to the user transmitting the Join message by the network access device.

Preferably, said step b) of the method comprises performing access control checking when the network access device receives the Join message: checking the user multicast information table of the user interface when multicast resources of the user interface are not sufficient, terminating the multicast GSQ process and directly performing quick-leaving when the user multicast information table of a multicast group is empty.

Preferably, said step b) of the method comprises deleting the item of the multicast group corresponding to the user identification information from the user multicast information table when said user is an IGMPv1 user and entering the multicast group is time out for the user.

Preferably, in said step a) of the method, the user identification information is a MAC address or IP address of the user, or other information which can identify the user.

Preferably, the user multicast information table defined in the present invention further includes items of multicast states to identify the multicast group as "active", "pending" or "idle" state.

According to the above definition to the multicast state, said step b) comprises setting the multicast state of the multicast group as "pending" state after deleting the item corresponding to the user identification information in the multicast group when said user IGMP message is the Leave message or entering the multicast group is time out for the user of IGMPv1, and further, updating the multicast state of the multicast group as "idle" state if there are no other users in the multicast group when the GSQ process finishes.

According to the above definition to the multicast state, processing on the Join message in said step b) further comprises performing access control checking: checking the user multicast information table of the user interface when multicast resources of the user interface are not sufficient, releasing bandwidth of the multicast data stream when an "idle" multicast group exists; otherwise, releasing bandwidth of the multicast data stream by the access control checking when a "pending" multicast group exists and the corresponding user identification information is empty.

The present invention further provides a network access device, which is connected to several user terminals via a user interface, characterized in the device comprising: a user multicast information table for saving a multicast address and user identification information of the user interface; an IGMP protocol processing unit for obtaining the user identification information from a user IGMP message by the network access device, retrieving the user multicast information table after access control checking and adding a corresponding item containing the multicast address and the user identification information into the user multicast information table if the user is new for the multicast group which he makes request for entering when said user IGMP message is a Join message, deleting the item of the multicast group corresponding to the user identification information from the user multicast information table, entering a GSQ process and waiting for a next IGMP message when said user IGMP message is a Leave message.

Preferably, said IGMP protocol processing unit performs access control checking when receiving the Join message: checking the user multicast information table of the user interface when multicast resources of the user interface are not sufficient, terminating the multicast GSQ process and directly performing quick-leaving when the user multicast information table of a multicast group is empty.

Preferably, said IGMP protocol processing unit is further for deleting the item of the multicast group corresponding to the user identification information from the user multicast information table when said user is an IGMPv1 user and entering the multicast group is time out for the user.

Preferably, the user identification information in said user multicast information table is a MAC address or IP address of the user, or other information which can identify the user.

Preferably, said user multicast information table of the network access device further includes items of multicast states to identify the multicast group as "active", "pending" or "idle" state.

According to the above definition to the multicast state, said IGMP protocol processing unit sets the multicast state of the multicast group as "pending" state after deleting the item corresponding to the user identification information in the multicast group when the received user IGMP message is the Leave message or entering the multicast group is time out for the user of IGMPv1.

According to the above definition to the multicast state, said IGMP protocol processing unit further updates the multicast state of the multicast group as "idle" state if there are no other users in the multicast group when the GSQ process finishes.

According to the above definition to the multicast state, said IGMP protocol processing unit performs access control checking: checking the user multicast information table of the user interface when multicast resources of the user interface are not sufficient, releasing bandwidth of the multicast data stream when an "idle" multicast group exists; otherwise, releasing bandwidth of the multicast data stream by the access control checking when a "pending" multicast group exists and the corresponding user identification information is empty.

According to the method and apparatus for multicast management of user interface provided in the present invention, the network access device updates the user multicast information table in real-time based on the multicast service information of the users, which on one hand reduces occupied memory resources, and on the other hand enhances speed and performance of channel switching, while ensuring not affecting other users. Under the existing network framework, it can not cost more to implement the network device described in the present invention, only with requirement of adding mechanism for dynamically tracing user multicast information in software to enhance quality of service of multicast service.

DETAILED DESCRIPTION OF THE INVENTION

Detailed description of the preferred embodiments of the present invention is provided as follows in conjunction with accompanying figures.

Figure 1:
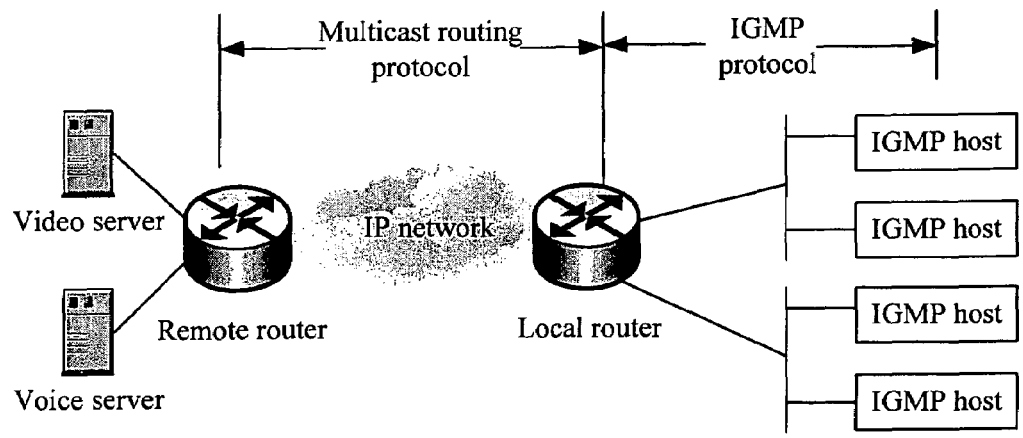
FIG. 1 is a schematic diagram of a typical IP multicast architecture.
Figure 2:
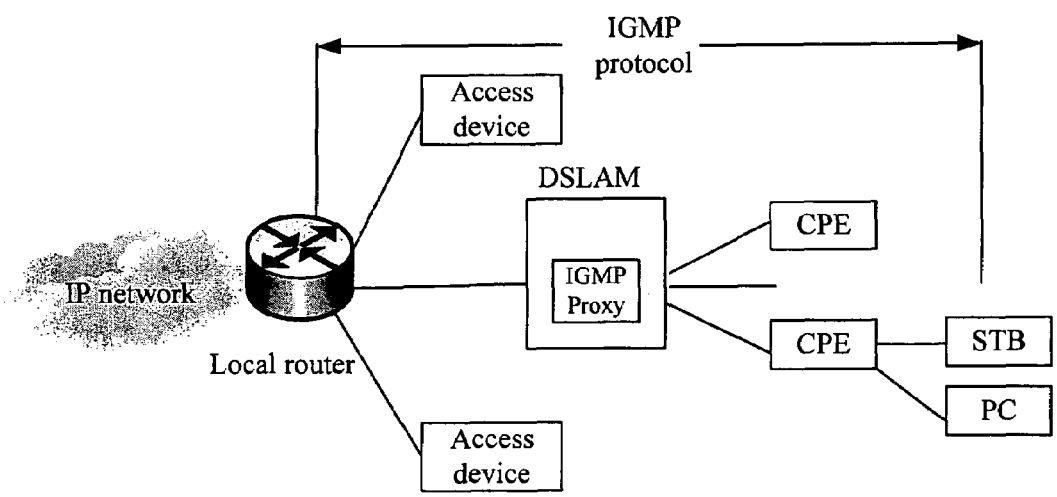
FIG. 2 is implementation of multicast service in a network access device DSLAM.
Figures 3, 4:
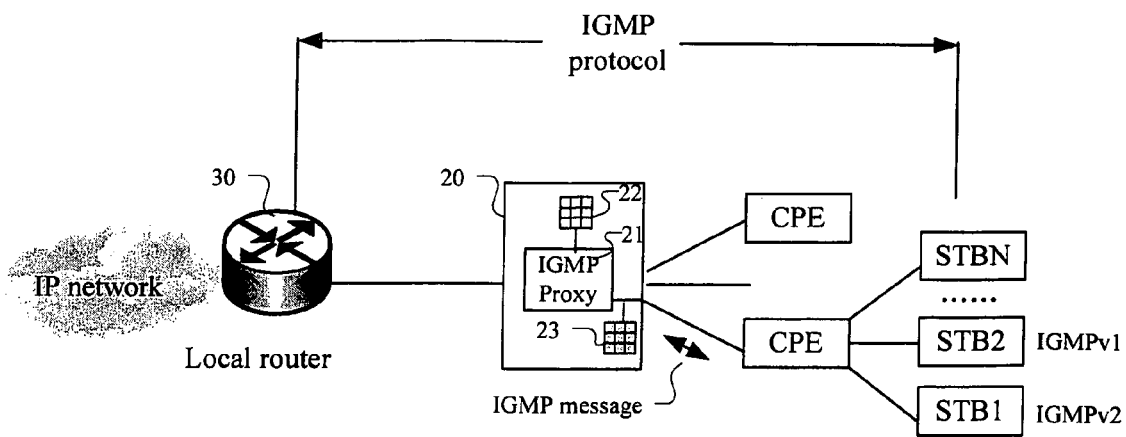
FIG. 3 is a structure schematic diagram of implementation of multicast service in an access device in accordance with the present invention.
FIG. 4 is a user multicast information table preferably used in a user interface of the network access device in accordance with the present invention.

FIG. 3 is a structure schematic diagram of implementation of multicast service in an access device in accordance with the present invention. A network access device 20 is connected to several CPEs via a network interface of the device, with each CPE connected to several set-top boxes (STB1, STB2 . . . STBN). The network access device 20 includes an IGMP protocol processing unit 21 for analyzing IP addresses of multicast groups in a multicast membership report message, creating a multicast forwarding table 22 for the IP address of a respective multicast group and the user interface, and forwarding the message to an upper layer network device after receiving the message from the network interface. The network access device 20 will provide a multicast data stream to the user interface based on the multicast forwarding table 22.

The IGMP protocol processing unit can be implemented by means of IGMP SNOOP or IGMP Proxy. The principle of the IGMP SNOOP protocol implementation is forming the multicast forwarding table 22 by means of intercepting the IGMP message transmitted from the STB to the local router 30; the network access device 20 only forwarding the received multicast packet to members of group according to the multicast forwarding table. The IGMP Proxy implements the same functions as the IGMP SNOOP does but with different mechanism: the IGMP SNOOP obtains associated information only by intercepting the IGMP message, while the IGMP Proxy intercepts the IGMP request from the STB, performs processing on it and then forward it to the local router 30.

According to ideas of the present invention, the network access device 20 sets a user multicast information table 23 for the user interface with items at least including multicast addresses and user identification information. The user multicast information table 23 should be apparently distinguished from the multicast forwarding table, and is used for achieving function of multicast service management of the user interface to establish the user interface and multicast service management of the user terminal on the user interface.

Compared with the conventional processing of the IGMP protocol processing unit, the improvements of the IGMP protocol processing unit in the present invention are obtaining the user identification information from an IGMP message of the user terminal, retrieving the user multicast information table 23 and adding a corresponding item containing the multicast address and the user identification information into the user multicast information table if the user is new for the multicast group which he makes request for entering when said user IGMP message is a Join message, entering a GSQ process to detect whether there are other users in the multicast group, while deleting the item of the user identification information corresponding to the user with a Leave message in the current multicast group from the user multicast information table 23, and waiting for a next IGMP message when said user IGMP message is the Leave message; deleting the item of the multicast group corresponding to the user identification information from the user multicast information table when said user is an IGMPv1 user without a Leave message mechanism and entering the multicast group is time out.

Generally, multicast access is limited with respect to the network access device. Access control checking (including user interface sources, system resource checking and user identity checking) is needed to determine whether to provide the requested multicast data stream to the user prior to processing on the Join message by the IGMP protocol processing unit. According to ideas of the present invention, it checks the user multicast information table of the user interface when multicast resources of the user interface are not sufficient, terminating the multicast GSQ process and directly performing quick-leaving when the user multicast information table of a multicast group is empty.

FIG. 4 is a user multicast information table preferably used in a user interface of the network access device in accordance with the present invention. The items of the user multicast information include multicast address and user identification information, in which the user identification information may be MAC address or IP address of the user terminal or other information identifying the user. In addition, the items may also include ones of multicast state identifying current operation state of the multicast at the user interface. For example, we can use "A" to represent that the multicast is in "active" state in which there are members receiving the multicast data stream at the user interface; use "B" to represent that they multicast is in "pending" state in which the multicast group is in the state of the GSQ process; use "C" to represent that the multicast is in "idle" state in which there is no member receiving the multicast data stream at the user interface. The object to set the items of multicast state is that: 1) the network access device may delete the multicast in the "idle" or "pending" state when necessary to release its internal data bus bandwidth; 2) when the user bandwidth resource is insufficient at the user interface and a new multicast is making request for entering it, it is needed to release the source at the user interface; 3) reserving "pending", "idle" states can allow the multicast user performing switching-back of channels to rapidly establish multicast connection, and provide selection for multicast deletion at the user interface.

Figure 5A:
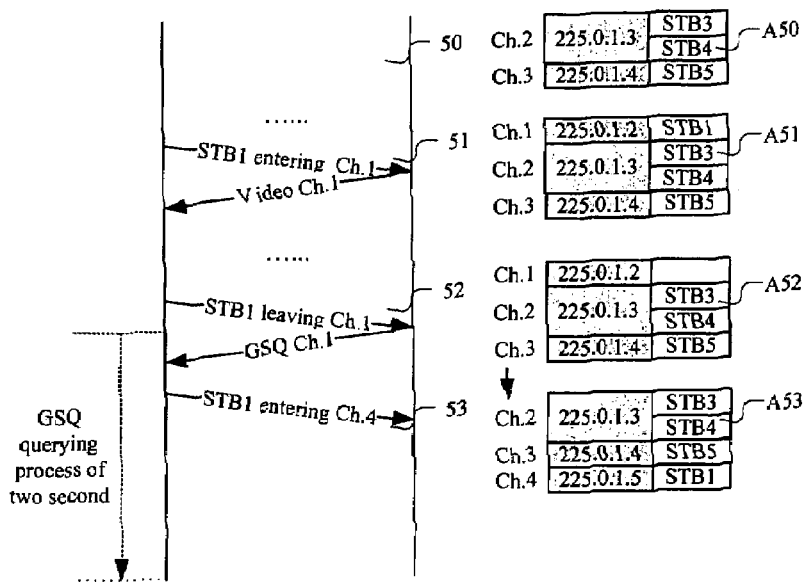
FIG. 5A is a schematic diagram of processing on the user IGMP message of the network access device in accordance with the present invention.

FIG. 5A is a schematic diagram of processing on the user IGMP message of the network access device in accordance with the present invention. At step 20, two multicast data streams (Ch. 2, Ch. 3) have already been established at a user interface, and the corresponding user multicast information table thereof is shown as A50 in the figure. At step 51, STB1 transmits a Join request for entering the Ch. 1 multicast group, IGMP protocol processing unit retrieves the user multicast information table and adds a corresponding item containing the multicast address and the user identification information into the user multicast information table if it is found that the user is new for the multicast group which he makes request for entering. The corresponding user multicast information table at that time is shown as A51 in the figure. At step 52, STB1 performs switching of channels, which transmits a Leave message to make request for leaving Ch. 1. IGMP protocol processing unit deletes the item of the multicast group corresponding to the user identification information from the user multicast information table, while it enters a GSQ process to query whether there are still other users of the multicast group on the interface and waits for a next IGMP message. The corresponding user multicast information table at that time is shown as A52 in the figure. Next, at step 53, IGMP protocol processing unit receives the Join message for making request for entering Ch. 4 transmitted by STB1, retrieves the user multicast information table and adds a corresponding item containing the multicast address and the user identification information into the user multicast information table if it is found that the user is new for the multicast group which he makes request for entering (The corresponding user multicast information table at that time is not shown in the figure). However, as above described, multicast access is usually limited. We can assume that each user interface can accommodate three multicast data streams because of user interface resource-bandwidth limit. There have already existed three multicast data streams at the user interface at that time, and thus the request for entering multicast data stream Ch. 4 can not be immediately responded to because of limit in the user interface bandwidth. The Join message of STB1 is not responded to until the above GSQ process finishes and there is no user at that time, which makes the Ch. 1 multicast stream stop to release bandwidth. However, according to the idea of the present invention, the IGMP protocol processing unit performs access control checking when receiving the Join message, further checks the user multicast information table of the user interface when multicast resources of the user interface are not sufficient. It can terminate the multicast GSQ process and perform quick-leaving to release bandwidth resource and thus the multicast stream Ch. 4 can be rapidly established since the user multicast information table of the multicast group Ch. 1 is empty. The corresponding user multicast information table at that time is shown as A53 in the figure.

Figure 5B:
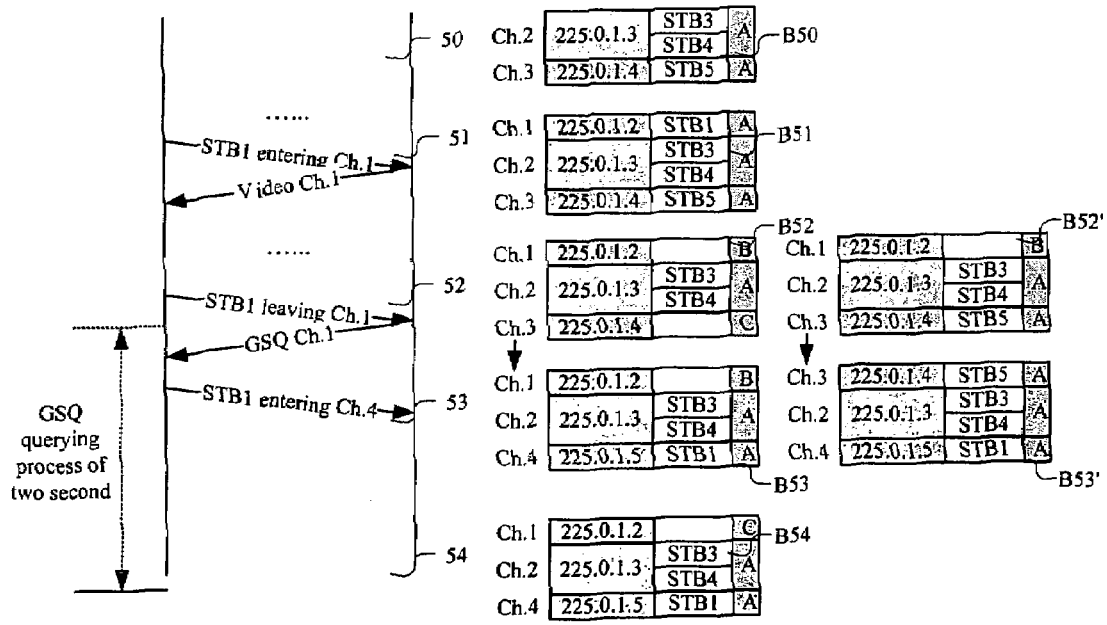
FIG. 5B is another schematic diagram of processing on the user IGMP message of the network access device in accordance with the present invention.

Next, we further describe the schematic diagram of processing on the user IGMP message of the network access device in accordance with the present invention provided in FIG. 5B in conjunction with the user multicast information table provided in FIG. 4. The multicast access is also limited, so assume that each user interface can accommodate three multicast data streams because of user interface bandwidth limit and the user multicast information table further includes the items of multicast state. The differences from FIG. 5A are: at step 52, STB1 performs switching of channels comprising transmitting a Leave message, the IGMP protocol processing unit sets the multicast state of the multicast group as "pending" state after deleting the user identification information STB1 corresponding to Ch. 1 from the user multicast information table, and enters a GSQ process to query whether there are still other users of the multicast group on the interface. The corresponding user multicast information table is shown as B52 in the figure. At step 53, IGMP protocol processing unit receives the Join message for making request for entering Ch. 4 transmitted by STB1, performs access control checking, further checks the user multicast information table of the user interface when multicast resources of the user interface are not sufficient, and first selectively deletes the Ch. 3 multicast stream in the "idle" state to release bandwidth resource if the Ch. 1 multicast state is "pending" and the Ch. 3 multicast state is "idle". The Ch. 4 multicast stream can be rapidly established after the corresponding item containing the multicast address of Ch. 4 and the user identification information is added into the user multicast information table. The corresponding user multicast information table is shown as B53 in the figure. As shown in step 54, the multicast state of Ch. 1 is updated as "idle" state after the GSQ process finishes and it is confirmed that there are no other users. The corresponding user multicast information table at that time is shown as B54 in the figure. Such arrangement can efficiently solve the problem of response time in switching-back of channels performed on the user.

With respect to processing on the user IGMP message of the network access device in accordance with the present invention provided in FIG. 5B, if the multicast group Ch. 3 is also in the "active" state, and only the multicast group Ch. 1 is in the "pending" state at step 52, the corresponding user multicast information table is shown as B52' in the figure. At step 53, IGMP protocol processing unit receives the Join message for making request for entering Ch. 4 transmitted by STB1, performs access control checking, further checks the user multicast information table of the user interface when multicast resources of the user interface are not sufficient, determines its corresponding item of user identification information if the Ch. 1 multicast state is "pending", and immediately deletes this multicast stream to release the resource occupied by the multicast data stream if the item is empty, which means there is no user. Also, the Ch. 4 multicast which the user makes request for enter can be rapidly established after the corresponding item containing the multicast address of Ch. 4 and the user identification information is added into the user multicast information table. The corresponding user multicast information table is shown as B53' in the figure.

While the description of the present invention has been provided in conjunction with the detailed embodiments thereof, it is obvious for those skilled in the art to make alternatives, modifications and changes in accordance with the above description. Therefore, such alternatives, modifications and changes shall be included in the present invention when falling into the sprit and scope of the invention defined by the appended claims.

What is claimed is:

1. A network access device, which is connected to a plurality of user terminals via a user interface, the network access device comprising:

a user multicast information storing table for storing a multicast address and user identification information of the user interface; and an IGMP protocol processing unit configured to obtain the user identification information from a user IGMP message by the network access device, retrieving the user multicast information after access control checking and adding a corresponding item containing the multicast address and the user identification information to the user multicast information storing table if the user is new to the multicast group which he makes request for entering when said user IGMP message is a Join message, deleting the item of the multicast group corresponding to the user identification information from the user multicast information table, entering a GSQ process and waiting for a next IGMP message when said user IGMP message is a Leave message, wherein said user multicast information storing table stores information indicating the current operation state of each multicast group.

2. The network access device of claim 1, wherein said IGMP protocol processing unit is configured to perform,
   access control checking when receiving the Join message,
   checking the user multicast information storing table of the user interface when multicast resources of the user interface are not sufficient, and
   terminating the multicast GSQ process and directly performing quick-leaving when the user multicast information table of a multicast group is empty.

3. The network access device of claim 1, wherein said IGMP protocol processing unit is further configured to delete the item of the multicast group corresponding to the user identification information from the user multicast information table when said user is an IGMPv1 user and entering the multicast group forces the IGMPv1 user to switch channels.

4. The network access device of claim 1, wherein the user identification information in said user multicast information storing table is one of a MAC address, an IP address of the user, and other information which can identify the user.

5. The network access device of claim 1, wherein said IGMP protocol processing unit is further configured to update the multicast state of the multicast group as "idle" state if there are no other users in the multicast group when the GSQ process finishes.

6. The network access device of claim 5, wherein processing on the Join message in said IGMP protocol processing unit further includes,
   performing access control checking,
   checking the user multicast information storing table of the user interface when multicast resources of the user interface are not sufficient,
   releasing bandwidth of the multicast data stream when an "idle" multicast group, exists and
   releasing bandwidth of the multicast data stream by the access control checking when a "pending" multicast group exists and the corresponding user identification information is empty.

7. The network access device of claim 1, wherein said user multicast information table is further adapted to indicate each multicast group state as one of "active", "pending" and "idle", wherein said IGMP protocol processing unit sets the multicast state of the multicast group to the "pending" state after deleting the item corresponding to the user identification information in the multicast group when the received user IGMP message is the Leave message or entering the multicast group forces the IGMPv1 user to switch channels.

8. A method for managing multicast connections of user interfaces in a network access device connected to several user terminals via the user interfaces, the method comprising:
   storing user multicast information for the user interface in the network access device in a user multicast information table having information items including at least a multicast address and user identification information;
   obtaining the user identification information from a user IGMP message by the network access device;
   retrieving the user multicast information table, and
   adding a corresponding item containing the multicast address and the user identification information to the user multicast information table, if the user is new for the multicast group which the user makes request for entering when said user IGMP message is a Join message,
   deleting the information items of the multicast group corresponding to the user identification information from the user multicast information table if the user IGMP message is a Leave message;
   entering a GSQ process to query if there are other users of the multicast group if the user IGMP message is a Leave message;
   waiting for a next IGMP message if the user IGMP message is a Leave message; and
   providing, by the network access device, a requested multicast data stream to the user transmitting the Join message, wherein
      the stored user multicast information items at the network access device are arranged in the user multicast information table indicating the current operation state of each multicast group.

9. The method of claim 8, wherein said obtaining the user identification information includes,
   performing access control checking when the network access device receives the Join message
   checking the user multicast information table of the user interface when multicast resources of the user interface are not sufficient,
   terminating the multicast GSQ process, and
   directly performing quick-leaving when the user multicast information table of a multicast group is empty.

10. The method of claim 8, wherein said obtaining the user identification information includes deleting the item of the multicast group corresponding to the user identification information from the user multicast information table when said user is an IGMPv1 user and entering the multicast group forces the user to switch channels.

11. The method of claim 8, wherein said storing includes storing, the user identification information including a MAC address or IP address of the user, or other information which can identify the user.

12. The method of claim 8, wherein said user multicast information table indicates each multicast group state as one of "active", "pending" and "idle", wherein the multicast state of the multicast group is set to "pending" after deleting the item corresponding to the user identification information in the multicast group when the received user IGMP message is the Leave message or entering the multicast group forces the IGMPv1 user to switch channels.

13. The method of claim 12, further includes updating the multicast state of the multicast group as "idle" state if there are no other users in the multicast group when the GSQ process finishes.

14. The method of claim 12, wherein said obtaining the user identification information further includes
   checking the user multicast information table of the user interface when multicast resources of the user interface are not sufficient, and
   releasing bandwidth of the multicast data stream when an "idle" multicast group exists.

15. The method of claim 14, wherein said access control checking further includes releasing bandwidth of the multicast data stream when a "pending" multicast group exists and the corresponding user identification information is empty.

* * * * *